United States Patent Office

3,235,562
Patented Feb. 15, 1966

3,235,562
MAKING LACTAMS BY THE VAPOR PHASE REDUCTIVE AMINATION OF OXO CARBOXYLIC ACID COMPOUNDS
Wilbur L. Shilling, Camas, Wash., assignor to Crown Zellerbach Corporation, San Francisco, Calif., a corporation of Nevada
No Drawing. Filed Jan. 29, 1962, Ser. No. 169,656
8 Claims. (Cl. 260—326.3)

This invention relates to a process for making lactams by the vapor phase reductive amination of oxo carboxylic acid compounds, and to a novel lactam product produced thereby.

Although processes for the reduction of oxo carboxylic acids to cyclic amides (lactams) are known, they have relied upon liquid phase reactions in solvent systems and have been characterized by numerous disadvantage such as:

(1) The solvent must be removed from the reaction product and recycled to the reaction zone.
(2) Pressure equipment is required when volatile solvents are used.
(3) A reaction time of from one to several hours is necessary.
(4) The long reaction time, in turn, leads to self-condensation of the oxo compuond, thus lowering the yield and complicating the product isolation procedure.

Accordingly it is the general object of the present invention to provide a one-step vapor phase process for the reductive amination of oxo acid compounds which can be effectuated continuously in a single reaction stage, at substantially atmospheric pressure, in a reaction time of but a fraction of a second, using a wide variety of oxo acid compound starting materials and producing a wide variety of lactam products.

It is another object of the invention to produce a novel lactam product.

Generally considered, the procedure by which the foregoing objects are attained comprises reacting with each other the components of a gaseous mixture comprising:

(a) at least one member of the group of organic carboxylic acid compounds consisting of the volatile oxo carboxylic acids and oxo carboxylic acid esters having from 2–5 atoms separating the oxo and carboxyl groups in the molecular chain,
(b) Hydrogen gas,
(c) And at least one member of the group of basic compounds consisting of ammonia and the volatile primary organic amines.

The hydrogen gas and the basic compound are used in at least stoichiometric proportions with respect to the organic carboxylic acid compound. The reaction is carried out in the presence of a hydrogenation catalyst in a reaction zone maintained at a temperature of between room temperature and 350° C. As a result, the carboxylic acid compound is converted to a lactam product which is withdrawn from the reaction zone, purified and applied to its several uses. A simple one-stage reaction procedure thus is afforded for preparing a wide variety of lactams in very substantial yields.

The reductive amination described herein is typified by the conversion of levulinic acid (gamma-oxovaleric acid) to 5-methyl-2-pyrrolidone in the following reaction:

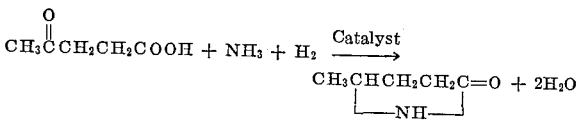

The levulinic acid of the above reaction is but illustrative, however, of a large group of oxo carboxylic acid compounds which may be employed in the herein described process. In general, any volatile oxo carboxylic acid compound may be employed in which the steric relationship of the oxo group to the carboxyl group is such as to allow cyclic amide formation. This means that the chain of atoms separating the oxo group and the carboxyl group must contain from 2–5 atoms, exclusive of the oxo and the carboxyl groups.

This chain may be composed entirely of carbon atoms, although if desired one or more of the carbon atoms not adjacent to the oxo or carboxyl groups may be replaced by an oxygen atom, a sulfur atom, or a nitrogen atom. Also, unsaturation may be present in the chain.

In addition, the process is applicable to the esters of the oxo carboxylic acids. These may be derived by reaction of the carboxylic acid with an alcohol, preferably with an aliphatic alcohol containing from 1–10 carbon atoms, inclusive. In the event that the carboxylic acid forms pseudo esters, as does levulinic acid, these also may be used as starting materials in the herein described process.

Examples of suitable oxo carboxylic acids and oxo carboxylic acid esters for use in my process thus are levulinic acid, dilevulinic acid (prepared by condensation of levulinic acid with furfural and hydrolysis of the product in alcohol), beta-acetylacrylic acid, 5-oxoadipic acid, the lower-alkyl substituted levulinic acids, the ortho-oxobenzoic acids such as phthalaldehydic acid, and the esters of the foregoing acids with the lower aliphatic alcohols containing from 1–10 carbon atoms.

Where dilevulinic acid, i.e. 4,7-dioxosebacic acid, or its esters, is used as a starting material a dilactam product is obtained, i.e. 2,2-ethylenebis - (5 - pyrrolidone). This compound has the following formula:

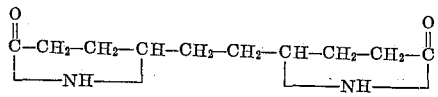

It is useful as a chemical intermediate in the manufacture of vinyl polymers or as a plasticizer.

It is contemplated that the gaseous hydrogen of commerce be employed as the reducing agent in the presently described reaction. This hydrogen should be of sufficient purity that poisons, such as sulfur or phosphorus compounds, which might inactivate the catalyst, are not present. In addition, reaction mixtures which produce hydrogen gas such as mixtures of carbon monoxide and steam, also may be employed. The presence, in reasonable amount, of nitrogen or other inert gaseous diluent in the hydrogen gas is not objectionable and may even be desirable, since it tends to moderate the exothermic reductive amination.

The particular basic compound employed together with the oxo carboxylic acid compound and the hydrogen depends upon whether or not a nitrogen-substituted lactam is desired as the product of the reaction. Where an unsubstituted lactam product is desired, ammonia is employed as the basic reactant. Where a nitrogen-substituted lactam product is desired, a primary amine is employed as the basic reactant. Any volatile primary amine is suitable for this use, whether it be alkyl, aryl, aralkyl or heterocyclic.

Since the reaction involved is reductive in character, any organic compound carrying a group reduceable to a primary amine under the conditions of the reaction also would be suitable. Such compounds include the aromatic and aliphatic nitro hydrocarbons and nitro alcohols, the imines, the nitroso compounds, the hydrazine derivatives, etc. Similarly, any compound reduceable to ammonia under the conditions of the reaction would be operable. Such compounds include hydrazine, the various oxides of nitrogen, etc.

The foregoing reactants should be employed in stoichiometric amounts such that at least about one mole of hydrogen and of ammonia or primary amine is employed for each mole-equivalent of oxo carboxylic acid. It is preferred to have moderate molar excess of hydrogen and ammonia or amine since this promotes conversion of a maximum amount of the oxo carboxylic acid to the lactam. A very large excess of hydrogen is not desirable, however, because it promotes simple reduction of the oxo carboxylic acid to the corresponding lactone. Any excess of hydrogen or of ammonia or amine is recoverable from the reaction mixture, of course, and may be reused.

Thus the molar ratio of the oxo carboxylic acid to hydrogen to ammonia or amine may fall within the broad range of from 1:1:1, to 1:15:15, respectively. A preferred range is from 1:1:1 to 1:4:6, respectively.

The catalyst employed in the present invention can be any of the hydrogenation catalysts suitable for vapor phase reactions. Nickel supported on an inert carrier such as kieselguhr is particularly suitable, although cobalt on kieselguhr also may be used. Surprisingly, barium-promoted copper chromite is a satisfactory catalyst for the vapor phase reductive amination of levulinic acid to 5-methyl-2-pyrrolidone, although it is inoperative when used in the liquid phase for the same purpose.

Other hydrogenation catalysts suitable for vapor phase operation in my process are copper, platinum, palladium, etc. supported on suitable inert carriers such as low-surface area alumina, silica, kieselguhr, clay, etc.

An appropriate amount of the foregoing or other catalysts is used, as determined by the size of the reaction vessel, and the contact time desired for a given gaseous feed rate. The catalyst may be employed to advantage in a fluidized bed, particularly where continuous operation is contemplated.

As noted above, the procedure for effectuating the herein described reaction simply comprises contacting the reactants with the catalyst at room or elevated temperatures for a very brief reaction time in a suitable reaction vessel, withdrawing the gaseous reaction mixture from the vessel, cooling the reaction mixture and separating the lactam product from the other reactants. This may be accomplished continuously, and any excess of hydrogen and ammonia or amine recycled to the reaction vessel for conversion of a further quantity of oxo carboxylic acid compound to lactam.

In carrying out this process, any suitable type of reaction vessel or tower supplied with a stationary or fluidized catalyst bed may be employed. The reaction may be carried out at atmospheric pressure, which is one of its advantages. However, it also may be carried out at reduced pressure or at superatmospheric pressure if desired.

The temperature employed is widely variable depending upon the reactants and the other conditions of the reaction. However, the reaction may be carried out within the broad range of from room temperature, i.e. about 20° C., up to about 350° C. At very low temperatures the reaction proceeds slowly, and at very high temperatures, over-reduction occurs, with the formation of amino alcohols, esters, ethers and amines. A preferred operating temperature range is from 150–250° C.

As also has been noted above, at the more elevated reaction temperatures but a very short reaction time is required to bring about conversion of a major proportion of the oxo carboxylic acid to lactam. The reaction time thus may be of the order of but a fraction of a second, i.e. of but 0.1 second, up to as much as 60 seconds for more recalcitrant materials and lower operating temperatures. A preferred reaction time is from 0.5 second to 20 seconds.

If desired, the liquid oxo carboxylic acid compound may be mixed with the hydrogen, since this assists in volatilizing the acid. Also, if the acid were to be mixed first with the ammonia or amine there might occur secondary reactions leading to the formation of products of low volatility and resulting in loss of starting materials as well as in fouling of the catalyst surface.

It therefore is desirable to dilute both the oxo carboxylic acid compound and the ammonia or amine separately with the hydrogen, and then to bring the two diluted gas streams into contact in the catalyst bed, where the formation of lactam occurs. This is of particular value when the free acids are used, as opposed to the acid esters, because of the tendency of the free acids to form salts with ammonia and amines.

The process of the invention is illustrated further in the following examples:

Example 1

This example illustrates the production of 5-methyl-2-pyrrolidone from levulinic acid by the presently described process.

A vertical, stainless steel tube surrounded by an electrically heated molten salt bath was charged with a commercially available catalyst in the form of ⅛ inch tablets containing 50% nickel, reduced and stabilized, and supported on kieselguhr. The catalyst was heated to 210° C. and about 800 ml. of hydrogen per minute was passed over it for two hours.

A stream of hydrogen then was passed through 60 g. of levulinic acid maintained at 210° C. and the mixture of hydrogen and levulinic acid vapor was led continuously into the top of the catalyst bed. At the same time a mixture of hydrogen and ammonia was preheated to 200° C. and passed into the catalyst bed just below the entry port of the first gas stream.

The molar ratio of levulinic acid to hydrogen to ammonia was 1:10:12.8 at the top of the catalyst bed and the pressure of the gas was just sufficient to overcome the resistance of the catalyst mass. The residence time of the reactants within the catalyst bed was about 3.3 seconds. Analysis by gas phase chromatography showed that, besides the water formed in the reaction, the pale yellow reaction product contained 87% 5-methyl-2-pyrrolidone. Upon its separation by fractional distillation through a 15 inch Vigreux column at 12 mm. and 125–127° C., the product had a refractive index $n_D$ of 1.4727. Upon cooling, it crystallized and remelted at 40–41° C.

Example 2

This example illustrates the production of 5-methyl-2-pyrrolidone from ethyl levulinate by the presently described process.

A stainless steel reactor tube in an electrically heated furnace was packed with catalyst of the type used in Example 1 and heated until a thermocouple imbedded in the catalyst mass indicated a temperature of 180° C.

Ethyl levulinate was vaporized by pumping it through a flow meter into a tube heated to about 350° C. with a stream of hydrogen flowing through it. The mixture of vapors was passed through a heated coil of stainless steel tubing to adjust the temperature of the vapors to 180° C. and then into the catalyst mass. At the same time a mixture of hydrogen and ammonia was passed through another coil heated to 180° C. and into the catalyst bed just beyond the entry port of the first gas stream.

The molar ratio of ester to hydrogen to ammonia was 1:2.5:13 and the residence time was 2 seconds. The temperature inside the reactor tube rose rapidly to 195° C. and remained there.

Analysis of the pale yellow product showed that it contained about 75% 5-methyl-2-pyrrolidone.

After about 90 minutes the temperature in the reactor was raised to 250° C. The pale yellow product contained about 78% lactam.

Again the temperature was raised, until the reactor reached 300° C. and the respective molar ratios were changed to 1:1.5:2. Even at this temperature, with a residence time of 4.5 seconds, the brown product contained 72% 5-methyl-2-pyrrolidone and a small amount of ethyl valerate.

*Example 3*

This sample illustrates the production of 1,5-dimethyl-2-pyrrolidone by the reaction of levulinic acid with methylamine and hydrogen.

Using the same apparatus as in Example 2, with the same catalyst, at 200–210° C., levulinic acid was vaporized in a stream of hydrogen and led into the catalyst bed. A mixture of methylamine and hydrogen was also heated to about 210° C. and led into the reaction zone, the ratio of levulinic acid to hydrogen to methylamine being 1:1.9:5.3.

After one hour of operation under these conditions, and with a residence time of 4 seconds, the yellow reaction product contained 85% 1,5-dimethyl-2-pyrrolidone.

The ratio of reactants was then changed to 1:4:5 and the residence time decreased to 3 seconds. After 60 minutes the product was 92% 1,5-dimethyl-2-pyrrolidone.

*Example 4*

This example illustrates the application of a copper chromite catalyst to the presently described procedure.

Using the apparatus described in Example 2, charged with a commercial copper chromite catalyst promoted with barium in the form of small tablets, hydrogen was passed through the catalyst bed as the temperature was raised slowly to 250° C. and held there for 8 hours. The bed then was cooled to 190° C. and levulinic acid, hydrogen and methylamine were led into it at a molar ratio of 1:11:5 and a residence time of 3 seconds. The pale yellow reaction product was 88% 1,5-dimethyl-2-pyrrolidone. The reactor was run satisfactorily under these conditions for one hour.

Similar results were obtained using ammonia in place of methylamine.

Using the same catalyst as above, but finely powdered, an attempt was made to carry out the reductive amination in the liquid phase.

A 1 liter, high pressure, stirred autoclave was charged with 120 g. levulinic acid, 250 ml. concentrated ammonium hydroxide and 5 g. of the catalyst. The autoclave was closed, pressured to 1200 p.s.i. with hydrogen, heated to 200° C. in one hour, held there 3 hours with stirring, and then cooled.

The catalyst was filtered from the very dark colored solution, which was concentrated and distilled at 3 mm. pressure. About 3 g. of gamma-valerolactone was obtained, followed by some levulinic acid, but no 5-methyl-2-pyrrolidone. Most of the product did not distill without decomposing and was evidently formed by the self-condensation of levulinic acid in the presence of ammonia to high molecular weight tarry products.

*Example 5*

This example illustrates the conversion of dilevulinic acid to 2,2'-ethylenebis-(5-pyrrolidone) by the presently described process.

The reactor tube described in Example 2 was packed with catalyst of the type used in Example 1 and heated to 250° C.

Dilevulinic acid ester, i.e. dimethyl 4,7-dioxosebacate, was pumped into a tube heated to about 350° C. with a stream of hydrogen flowing through it. The mixture of vapors then was passed into the catalyst bed. A mixture of hydrogen and ammonia was heated to 250° C. and passed into the bed at the same time.

The molar ratio of the ester to hydrogen to ammonia was 1:10:3 and the residence time was 5 seconds.

The resulting reaction product was a yellow viscous liquid. Upon analysis, it was found to contain 70% of 2,2'-ethylenebis-(5-pyrrolidone) which was isolated by fractional distillation at reduced pressure. The distillate formed white crystals characterized by solubility in cold water and a nitrogen content of 14.2%. Upon reaction with hydrogen chloride in ethyl ether, it formed a crystalline dihydrochloride.

Having thus described by invention in preferred embodiments, what I claim as new and desire to protect by Letters Patent is:

1. The process of making 5-methyl-2-pyrrolidone which comprises reacting a gaseous mixture comprising levulinic acid, hydrogen and ammonia in a molar ratio of from 1:1:1 to 1:15:15, respectively, in the presence of a hydrogenation catalyst at a temperature of between 150 and 250° C., and separating the 5-methyl-2-pyrrolidone from the reaction mixture.

2. The process of making 5-methyl-2-pyrrolidone which comprises reacting a gaseous mixture comprising a levulinic acid ester of an alkanol of from 1–10 carbon atoms inclusive, hydrogen and ammonia and a molar ratio of from 1:1:1 to 1:15:15, respectively, in the presence of a hydrogenation catalyst and at a temperature of between 150 and 250° C.; cooling the reaction mixture; and separating the 5-methyl-2-pyrrolidone therefrom.

3. The process of making 5-methyl-2-pyrrolidone which comprises reacting a gaseous mixture comprising beta-acetylacrylic acid, hydrogen and ammonia in a molar ratio of from at least stoichiometric amount up to 1:15:15, respectively, in the presence of a hydrogenation catalyst and at a temperature of between 150 and 250° C.; cooling the reaction mixture; and separating the 5-methyl-2-pyrrolidone therefrom.

4. The process of making 5-methyl-2-pyrrolidone which comprises reacting a gaseous mixture comprising a beta-acetylacrylic acid ester of an alkanol of from 1–2 carbon atoms inclusive, hydrogen and ammonia in a molar ratio of from at least the stoichiometric amount up to 1:15:15, respectively, in the presence of a hydrogenation catalyst and at a temperature of between 150° and 250° C., cooling the reaction mixture; and separating the 5-methyl-2-pyrrolidone therefrom.

5. The process of making 2,2'-ethylenebis-(5-pyrrolidone) which comprises reacting a gaseous mixture comprising dilevulinic acid and at least stoichiometric proportions, with respect to the dilevulinic acid, of hydrogen and ammonia, with a hydrogenation catalyst and at a temperature of between 150 and 250° C.; cooling the reaction mixture; and separating the 2,2'-ethylenebis-(5-pyrrolidone) therefrom.

6. The process of making 2,2'-ethylenebis-(5-pyrrolidone) which comprises reacting a gaseous mixture comprising a dilevulinic acid ester of an alkanol of from 1–2 carbon atoms inclusive, and at least stoichiometric proportions with respect to the dilevulinic acid ester, of hydrogen and ammonia, with a hydrogenation catalyst, in a reaction zone maintained at a temperature of between 150 and 250° C.; and separating the 2,2'-ethylenebis-(5-pyrrolidone) from the reaction mixture.

7. The process of making lactams which comprises: reacting a gaseous mixture comprising
   (a) an oxo compound selected from the group consisting of levulinic acid, dilevulinic acid, lower alkyl levulinic acids, beta-acetylacrylic acid, 5-oxoadipic acid, ortho-oxobenzoic acids, and esters thereof with an alkanol of from 1 to 2 carbon atoms,
   (b) hydrogen gas
   (c) and an amine selected from the group consisting of ammonia and primary alkyl amines; said oxo compound and said primary alkyl amine being volatile at a reaction temperature of between 20° C. and 350° C.; said hydrogen gas and said amine being used in at least stoichiometric proportions with respect to said oxo compound;

said reaction being carried out in the presence of a hydrogenation catalyst in a reaction zone at said reaction temperature of between 20° C. and 350° C., thereby converting said oxo compound to a lactam product; and withdrawing and recovering said lactam product from said reaction zone.

8. The process of claim 7 wherein the molar ratio of said oxo compound, hydrogen gas and amine is from 1:1:1 to 1:15:15, respectively; and said reaction is effected at a temperature of between 150° C. and 250° C. for a time of from 0.1 to 60 seconds.

References Cited by the Examiner
UNITED STATES PATENTS 2,817,646  12/1957  Payne _____ 260—239.3

OTHER REFERENCES

Hayashi: "Chemical Abstracts," vol. 53, page 8105a (1959).

IRVING MARCUS, *Primary Examiner.*

NICHOLAS S. RIZZO, *Examiner.*